April 29, 1958 W. W. KIOUS 2,832,145
GAUGE
Filed Oct. 11, 1955
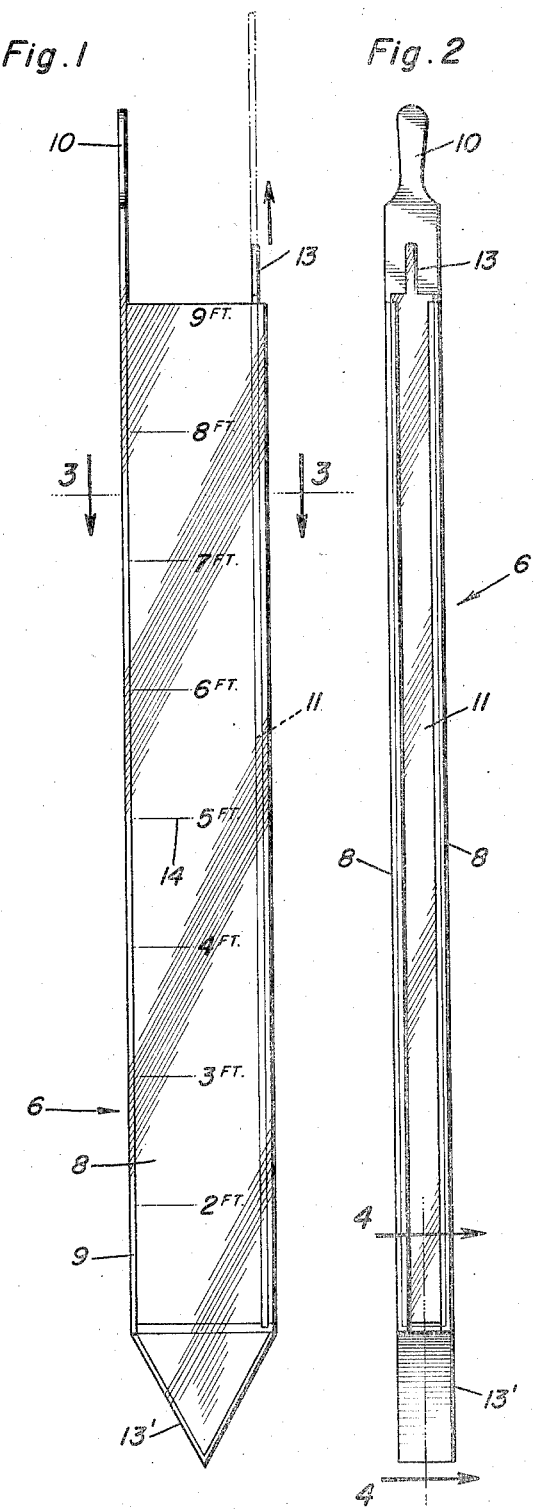
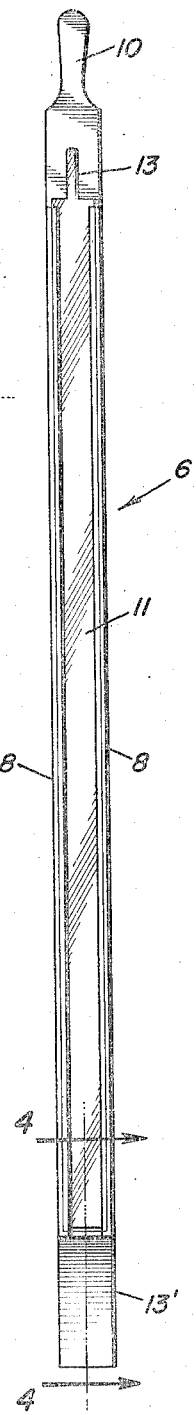
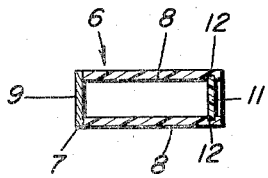
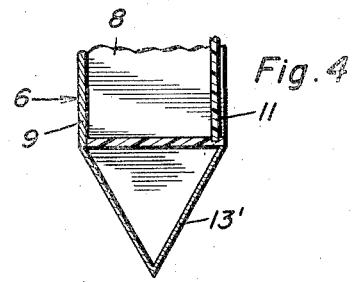
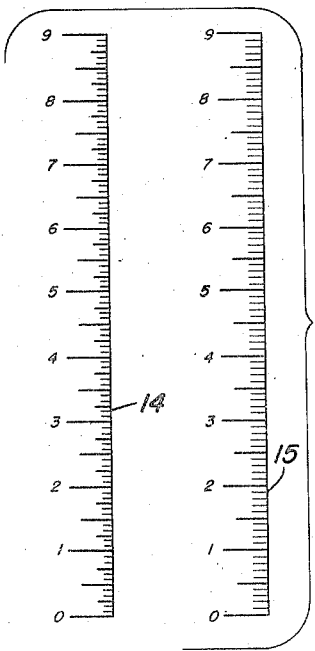
William W. Kious
INVENTOR.

United States Patent Office 2,832,145
Patented Apr. 29, 1958

2,832,145

GAUGE

William W. Kious, Coalinga, Calif., assignor to Stephen Corder, Coalinga, Calif.

Application October 11, 1955, Serial No. 539,732

1 Claim. (Cl. 33—126.4)

The present invention relates to new and useful improvements in gauges for use particularly in the oil producing industry and has for its primary object to provide, in a manner as hereinafter set forth, novel visual means for accurately measuring the quantity of fluid in different sizes of gauge tanks or other containers and showing the exact percentages of oil and water, in addition to permitting samples to be taken at any desired depth for testing.

Other objects of the invention are to provide a combination visual gauge, indicator and sampler of the aforementioned character which will be comparatively simple in construction, strong, durable, efficient and reliable in use, light in weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation of a gauge constructed in accordance with the present invention;

Figure 2 is a view in front elevation of the device;

Figure 3 is a view in horizontal section, taken substantially on the line 3—3 of Figure 1;

Figure 4 is a view in vertical section through the lower end portion of the device, taken substantially on the line 4—4 of Figure 2; and, Figure 5 is a view of the two scales which are provided on the sides of the device.

Referring now to the drawing in detail, it will be seen that the embodiment of the invention which has been illustrated comprises a tube of suitable transparent plastic which is designated generally by reference character 6. The transparent tube 6, which may be of any desired dimensions, is substantially rectangular in horizontal section, as shown to advantage in Figure 3 of the drawing.

The tube 6 includes a body 7 of substantially U-shaped horizontal section comprising sides 8 and a back 9. Rising from the upper end of the back 9 is a handle 10.

The front of the body 7 is open and slidable therein is a transparent closure 11. The sides 8 of the body 7 have formed in the front portions thereof opposed grooves or channels 12 in which the slidable closure 11 is operable. A handle 13 rises from the upper end of the closure 11.

The tube 6 is open at its upper end. The tube 6 includes a closed, substantially tapered or wedge-shaped hollow lower end portion 13' which permits said tube to be lowered into the fluid with minimum disturbance. The sides 8 of the body 7 are provided with scales 14 and 15 providing a selection of units for measuring the contents of gauge tanks or other containers.

It is thought that the use of the gauge will be readily apparent from a consideration of the foregoing. Briefly, holding the device by the handle 10 and with the closure 11 in raised or open position, the tube 6 is lowered into the fluid. As above indicated, the tapered lower end portion 13' of the tube 6 permits this to be accomplished substantially without disturbing the fluid. When the tube 6 has been lowered to the bottom of the tank, the closure 11 is closed for trapping the fluid in said tube. The tube 6 with the fluid trapped therein is then lifted out of the tank. The volume of fluid in the tank may now be readily ascertained by consulting the appropriate scale 14 or 15, the level of the fluid being clearly visible through the transparent tube 6. By simply permitting the gauge to stand long enough for the oil and water to separate, the percentage of each may readily be determined. By opening the closure 11, lowering the tube 6 to the desired level and then closing said closure 11, samples of the fluid may readily be taken from any depth.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A gauge comprising: a vertical tube of substantially rectangular horizontal section open at its upper end and including a closed, substantially wedge-shaped lower end portion, said tube further including a body of substantially U-shaped horizontal section comprising spaced opposed, transparent side walls having scales thereon and further comprising a back, a handle rising from said back, said body being open at its front, said side walls having opposed vertical channels in the front portions thereof, a closure slidable in the channels for closing the front of the body, and an operating handle rising from the upper end of said closure.

References Cited in the file of this patent

UNITED STATES PATENTS

| 243,948 | Newell | July 5, 1881 |
| 892,943 | Drawe | July 7, 1908 |
| 2,004,568 | Carpinello | June 11, 1935 |